US012750209B2

(12) United States Patent
Murthy et al.

(10) Patent No.: US 12,750,209 B2
(45) Date of Patent: Sep. 29, 2026

(54) CLUSTER ENCRYPTION DURING DEPLOYMENT

(71) Applicant: VMware LLC, Palo Alto, CA (US)

(72) Inventors: Niharika Narasimha Murthy, Bangalore (IN); Akash Kodenkiri, Bangalore (IN); Ammar Rizvi, Bangalore (IN); Sandeep Sinha, Bangalore (IN)

(73) Assignee: VMware LLC, Palo Alto, CA (US)

( * ) Notice: Subject to any disclaimer, the term of this patent is extended or adjusted under 35 U.S.C. 154(b) by 59 days.

(21) Appl. No.: 18/902,276

(22) Filed: Sep. 30, 2024

(65) Prior Publication Data

US 2025/0125946 A1 Apr. 17, 2025

(30) Foreign Application Priority Data

Oct. 13, 2023 (IN) ............................ 202341068988

(51) Int. Cl.
*H04L 9/08* (2006.01)
*H04L 67/1097* (2022.01)

(52) U.S. Cl.
CPC .......... *H04L 9/0822* (2013.01); *H04L 9/0825* (2013.01); *H04L 67/1097* (2013.01)

(58) Field of Classification Search
CPC .. H04L 9/0822; H04L 9/0825; H04L 67/1097
See application file for complete search history.

(56) References Cited

U.S. PATENT DOCUMENTS 12,309,258 B2 * 5/2025 Xie ........................ H04L 9/085
2015/0319160 A1 11/2015 Ferguson et al.
2022/0019367 A1 1/2022 Freilich et al.
2022/0407685 A1 12/2022 Xie et al.

OTHER PUBLICATIONS

European Patent Office, Extended Search Report, Application No. 24206094.5, Feb. 25, 2025, 12 pages.

* cited by examiner

*Primary Examiner* — Baotran N To
(74) *Attorney, Agent, or Firm* — Quarles & Brady LLP

(57) ABSTRACT

An example method for encrypting clusters during deployment may include retrieving, from a blueprint, resource information required to deploy a cluster including a host computing system and a virtual cluster manager node to manage the host computing system. The resource information may include host information and disk information required to deploy the virtual cluster manager node, and encryption information associated with a key provider. Based on the host information and the disk information, a clustered datastore may be created on the host computing system. Further, the virtual cluster manager node may be deployed on the clustered datastore. Based on the encryption information associated with the key provider, the virtual cluster manager node and associated disks may be encrypted. Upon encrypting the virtual cluster manager node, a cluster may be created and the host computing system may be added to the cluster.

17 Claims, 7 Drawing Sheets

```
{
  "__version":"2.13.0",                                                    502
  "new_vcsa":{
    "esxi":{
      "hostname":"<FQDN or IP address of the ESXi host on which to deploy the new appliance>",
      "username":"root",
      "password":"<Password of the ESXi host root user. If left blank, or omitted, you will be prompted to
enter it at the command console during template verification.>",
      "deployment_network":"VM Network",
      "VCSA_cluster":
{
          "enabled":"<Set the value to 'true' to enable vSAN encryption.>",      504
          "kmipServer":{
            "keyProviderId":"<Globally unique ID for the crypto key provider. Servers with the same ID
must provide the same keys. Cannot be empty.>",
            "kmipAddress":"<Address of the KMIP server.>",                      506
            "kmipName":"<Name of the KMIP server.>",
            "kmipPort":"<Port of the KMIP server.>",
            "proxyAddress":"<Address of the proxy server. Set value to empty string to delete the entry.
(optional)>",
            "proxyPort":"<Port of the proxy server. Set value '-1' to delete the entry. (optional)>",
            "userName":"<Username to authenticate to the KMIP server. Set value to empty string to
delete the entry. (optional)>",
            "password":"<Password to authenticate to the KMIP server. Set value to empty string to
delete the entry. (optional)>",
            "kmsServerCerts":"<A list of certificates of Key Management Servers in PEM encoding. Host
will use these certificates to decide if a KMS should be trusted or not.>",
            "clientKey":"<Client private key. Host will use this key for authentication when connecting to
KMS.>",
            "clientCert":"<Client certificate in PEM encoding. Host will use this certificate for authentication
when connecting to KMS.>" },
          "nativeKeyProvider":{
            "keyProviderId":"<Globally unique ID for the crypto key provider. Servers with the same ID
must provide the same keys. Cannot be empty.>",                                  508
            "tpmRequired":"<TPM Required or Not>",
            "keyId":"<The key identifier is required to be a 128-bit UUID represented as a hexadecimal
string in '12345678-abcd-1234-cdef-123456789abc' format. If it's not provided, the system will generate a
random key ID.>",
            "keyDerivationKey":"<Key used to derive data encryption keys. Base64 encoded. If it's not
provided, the system will generate a random key.>"
          }
        },
        "storage_pool":{
          "single_tier":[
            "<List of disk UUIDs or canonical names to be added to a vSAN storage pool as vSAN single
tier devices.>"
          ]
        },
        "vsan_hcl_database_path":"<Local path to the vSAN HCL database. If the vSAN HCL database
present in this location is not up-to-date, the installer will download the latest version of the database and
replace it with the older version.>"
      }
    },
```

FIG. 5

500

CLUSTER ENCRYPTION DURING DEPLOYMENT

RELATED APPLICATIONS

This application claims priority to Indian Application No. 202341068988 filed Oct. 13, 2023, by VMware LLC, entitled "CLUSTER ENCRYPTION DURING DEPLOYMENT," which is hereby incorporated by reference in their entirety for all purposes.

TECHNICAL FIELD

The present disclosure relates to computing environments, and more particularly to methods, techniques, and systems for encrypting a virtual cluster manager node and associated disks during deployment in the computing environment.

BACKGROUND

Virtualization allows the abstraction and pooling of hardware resources to support virtual machines in a software-defined networking (SDN) environment, such as a software-defined data center (SDDC). For example, through server virtualization, virtualization computing instances such as virtual machines (VMs) running different operating systems may be supported by the same physical machine (e.g., referred to as a host). Each virtual machine may be provisioned with virtual resources to run an operating system and applications. The virtual resources may include central processing unit (CPU) resources, memory resources, storage resources, network resources, and the like. Hosts may be arranged into a cluster containing multiple hosts. In such a virtualization environment, there may be a virtualization manager or a virtual cluster manager node to manage a cluster of hosts (i.e., cluster nodes) to provide logical networking services. An example of the virtualization manager or the virtual cluster manager node is VMware vCenter® server, a closed appliance that hosts various management services for managing the SDDC.

BRIEF DESCRIPTION OF THE DRAWINGS

FIG. 5 shows an example template or blueprint to deploy a vCenter Server with a vSAN and vSphere Life Management (vLCM) cluster on a host computing system.

Figure 1:
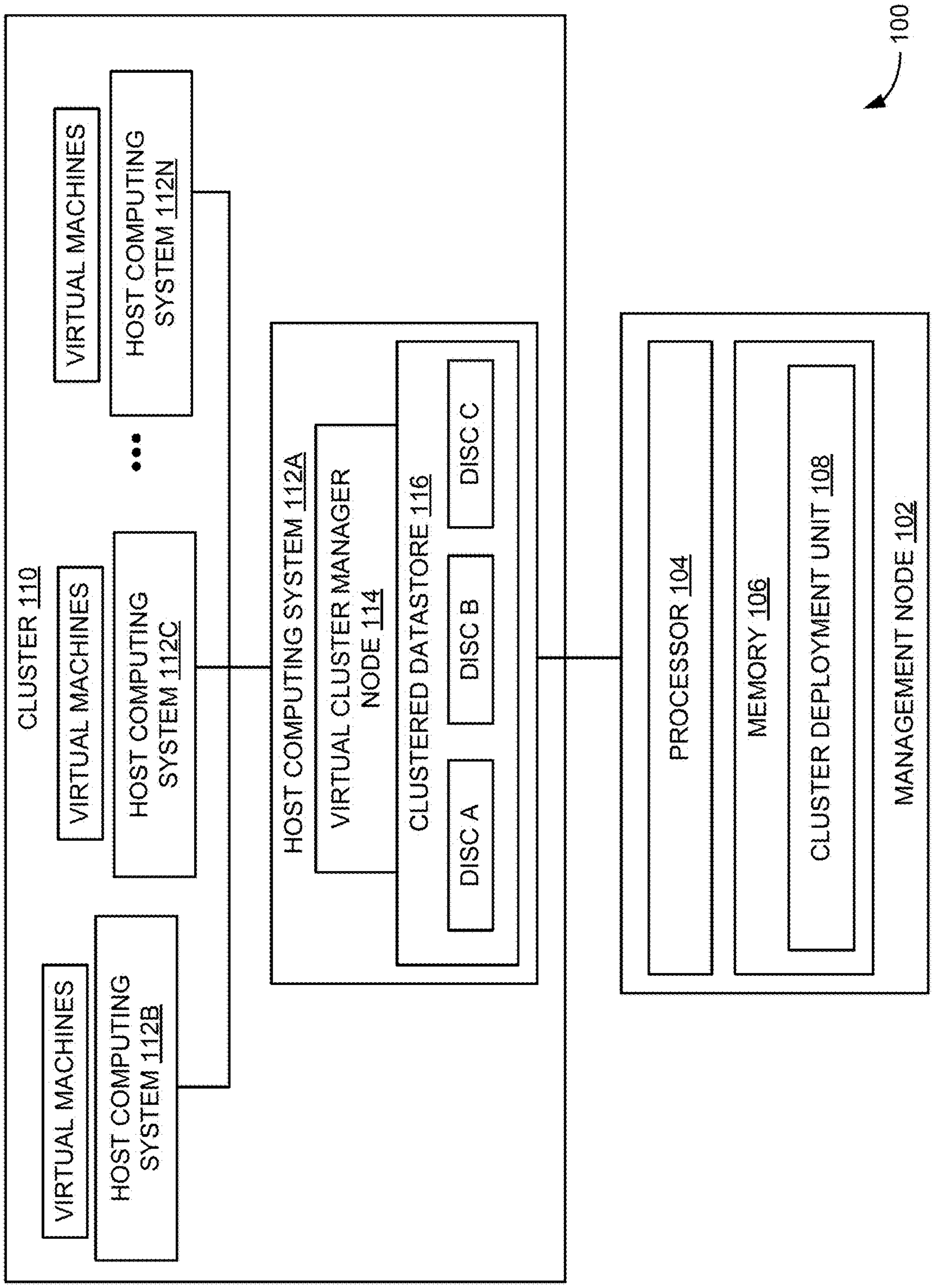
FIG. 1 is a block diagram of an example computing environment, including a management node to encrypt a virtual cluster manager node and associated disks during deployment.

The drawings described herein are for illustrative purposes and are not intended to limit the scope of the present subject matter in any way.

DETAILED DESCRIPTION

Examples described herein may provide an enhanced computer-based and/or network-based method, technique, and system to encrypt clusters during deployment of the clusters in a computing environment. The paragraphs to present an overview of the computing environment, existing methods to encrypt clusters in the computing environment, and drawbacks associated with the existing methods.

Computing environment may be a virtual computing environment (e.g., a cloud computing environment, a virtualized environment, and the like). The virtual computing environment may be a pool or collection of cloud infrastructure resources designed for enterprise needs. The resources may be a processor (e.g., central processing unit (CPU)), memory (e.g., random-access memory (RAM)), storage (e.g., disk space), and networking (e.g., bandwidth). Further, the virtual computing environment may be a virtual representation of the physical data center, complete with servers, storage clusters, and networking components, all of which may reside in virtual space being hosted by one or more physical data centers. Example virtual computing environment may include multiple endpoints (e.g., physical computers, virtual machines, and/or containers). For example, the computing environment may include multiple application hosts (i.e., physical computers) executing different virtual computing instances (e.g., referred to as workloads) such as virtual machines, containers, and the like running therein. In some examples, multiple hosts may be arranged into a cluster. In such a virtualization environment, there may be a virtualization manager (i.e., a virtual cluster manager node) to manage a cluster of hosts (i.e., cluster nodes) to provide logical networking services. An example of the virtualization manager or the virtual cluster manager node is VMware vCenter® server.

For example, VMware vSphere is a suite of virtualization software for implementing and managing a virtual machine infrastructure. The software includes vSphere hypervisor that implements virtual machines on physical machines (also referred to as "host computers" or "hosts"), virtual storage area network (vSAN) that pools and shares local storage across all hosts in a Virtual SAN cluster, vCenter Server that centrally provisions and manages vSphere objects, and vSphere Web Client (server) that allows web browser access to the vCenter Server. Virtual SAN software may be embedded in vSphere hypervisor software.

Further, vSAN uses the concept of a disk group as a container for solid-state drives (SSDs) and hard disk drives (HDDs). On each node that contributes storage to a Virtual SAN cluster, the node's local drives are organized into one or more disk groups. Each disk group includes one SSD that serves as read cache and write buffer, and one or more HDDs that serve as permanent storage. The aggregate of the disk groups from all the nodes forms a Virtual SAN (vSAN) datastore distributed and shared across the nodes.

In a green field deployment, a virtualization manager installer may setup a vSAN datastore on a single node (i.e., the same node on which the VMware vCenter® server to live on) and deploy the VMware vCenter® server Open Virtual Appliance (OVA) on top of the vSAN datastore. To complete the vSAN cluster setup, the remaining nodes of vSAN may be added on to the existing 1-node cluster.

In the existing approach, customers may lack a mechanism for encrypting data while deploying the virtual cluster manager node (e.g., VMware vCenter® server) directly on the vSAN datastore. Enabling encryption may be available only after the deployment of a vCenter server in the greenfield scenario, where the customer may have to first deploy the vCenter Server on the vSAN datastore and then enable encryption during the post configuration phase. Encrypting the virtual cluster manager node after deployment may pose the security risk.

Thus, in the existing scenarios, the data center security may be a concern as there is no integrated mechanism with the virtualization manager installers to provide the security, particularly in case of a hyper-converged infrastructure appliance and when failures to tolerate policies occurs. For example, there is no way to detect, report, and proactively address errors that may precede a storage failure during the vSAN cluster bootstrap. The absence of such support may increase the risk of data loss.

Examples described herein may provide a management node including a cluster deployment unit to encrypt data while deploying the virtual cluster manager node (e.g., VMware vCenter® server) on a vSAN datastore in a greenfield deployment scenario. During operation, the cluster deployment unit may retrieve, from a blueprint, resource information required to deploy a cluster. The cluster may include a plurality of cluster nodes and the virtual cluster manager node to manage the plurality of cluster nodes. The resource information may include host information and disk information required to deploy the virtual cluster manager node, and encryption information associated with a key provider. Further, based on the host information and the disk information, the cluster deployment unit may create a clustered datastore on a cluster node (e.g., a host computing system) of the plurality of cluster nodes. Furthermore, the cluster deployment unit may deploy the virtual cluster manager node on the clustered datastore. Further, based on the encryption information associated with the key provider, the cluster deployment unit may encrypt the virtual cluster manager node and associated disks. Upon encrypting the virtual cluster manager node, the cluster deployment unit may create the cluster and add the plurality of cluster nodes that are managed by the virtual cluster manager node to the cluster. Thus, examples described herein may provide encryption of the virtual cluster manager node and associated disks during the deployment of the virtual cluster manager node.

In the following description, for purposes of explanation, numerous specific details are set forth in order to provide a thorough understanding of the present techniques. However, the example apparatuses, devices, and systems, may be practiced without these specific details. Reference in the specification to "an example" or similar language means that a particular feature, structure, or characteristic described may be included in at least that one example but may not be in other examples.

Referring now to the figures, FIG. 1 is a block diagram of an example computing environment 100, including a management node 102 to encrypt a virtual cluster manager node 114 and associated disks (e.g., disks A, B, and C) during deployment. Example computing environment 100 may be a cloud computing environment (e.g., a virtualized cloud computing environment). For example, the cloud computing environment may be enabled by vSphere®, VMware's cloud computing virtualization platform. The cloud computing environment may include one or more computing platforms that support the creation, deployment, and management of virtual machine-based cloud applications or services or programs. An application, also referred to as an application program, may be a computer software package that performs a specific function directly for an end user or, in some cases, for another application. Examples of applications may include MySQL, Tomcat, Apache, word processors, database programs, web browsers, development tools, image editors, communication platforms, and the like.

Example computing environment 100 may be a cloud computing platform, which may refer to an operating system and hardware of a server in an Internet-based data center. It allows software and hardware products to co-exist remotely and at scale. Further, there are different types of cloud computing platforms to meet varying needs of users such as a public cloud platform, a private cloud platform, and a hybrid cloud platform. The public cloud platform is a third-party provider that delivers computing resources over the Internet such as Amazon Web Services (AWS), Google Cloud Platform, Alibaba, Microsoft Azure, IBM Bluemix, or the like. The private cloud platform may be exclusive to a single organization (e.g., in an on-site data center or hosted by a third-party service provider). The hybrid cloud platform may be a combination of the public and private cloud platforms.

As shown in FIG. 1, computing environment 100 may include a management node 102. In an example, management node 102 may include a processor 104. Processor 104 may refer to, for example, a central processing unit (CPU), a semiconductor-based microprocessor, a digital signal processor (DSP) such as a digital image processing unit, or other hardware devices or processing elements suitable to retrieve and execute instructions stored in a storage medium, or suitable combinations thereof. Processor 104 may, for example, include single or multiple cores on a chip, multiple cores across multiple chips, multiple cores across multiple devices, or suitable combinations thereof. Processor 104 may be functional to fetch, decode, and execute instructions as described herein. Further, management node 102 includes memory 106 coupled to processor 104. Memory 106 may include cluster deployment unit 108. Furthermore, processor 104 may execute cluster deployment unit 108 stored in memory 106.

During operation, cluster deployment unit 108 may receive a request to deploy cluster 110 in computing environment 100 based on a blueprint of a cloud management platform. For example, the request to deploy cluster 110 may include a request to deploy a plurality of host computing systems 112A-112N and a virtual cluster manager node 114 to manage plurality of host computing systems 112A-112N. The host computing system may be a physical computer (e.g., ESXi, which is an enterprise-class, type-1 hypervisor). The physical computer may be a hardware-based device (e.g., a personal computer, a laptop, or the like) including an operating system (OS). Further, plurality of host computing systems 112A-112N may execute different virtual computing instances such as virtual machines, containers, and the like running therein. A virtual machine may operate with its own guest OS on the physical computer using resources of the physical computer virtualized by virtualization software (e.g., a hypervisor, a virtual machine monitor, and the like). A container may be a data computer node that runs on top of a host operating system without the need for the hypervisor or separate operating system. Further, virtual cluster manager node 114 may include a virtual machine executing a management application to manage plurality of host computing systems 112A-112N. An example of the virtual cluster manager node is VMware vCenter® server, which is a closed appliance that hosts various management services for managing host computing systems 112A-112N.

In response to receiving the request, cluster deployment unit 108 may retrieve, from the blueprint, resource information required to deploy cluster 110. An example blueprint may be a preconfigured template to provide the necessary resource information to deploy cluster 110. In an example, the resource information may include host information (e.g., information associated with a host computing system 112A such as memory, CPU sockets, manufacturer details, CPU specification, SSD capacity/quantity, GPU details, and the like) and disk information (e.g., information associated with disk A, disk B, and disk C such as disk type, disk capacity in GB, and the like) required to deploy virtual cluster manager node 114, and encryption information associated with a key provider. The blueprint may include various specifications and attributes to deploy the cluster such as sizing constants, specification of hosts in the cluster, primarily compute and storage. In some examples, cluster deployment unit 108 may enable a user to modify parameters of the blueprint used to deploy cluster 110 to include the encryption information associated with the key provider. In an example, the blueprint may include resource information to deploy a single host computing system that is used to create the data store. In other examples, the blueprint may also include resource information to deploy a multiple host computing systems that are to be managed by virtual cluster manager node 114.

For example, cluster deployment unit 108 may retrieve the disk information including Universally Unique Identifiers (UUIDs), canonical names, or both associated with disks (e.g., disk A, disk B, and disk C) to check hardware compatibility of plurality of host computing system 112A to deploy virtual cluster manager node 114. Further, cluster deployment unit 108 may retrieve the host information including a network identifier associated with host computing system 112A on which virtual cluster manager node 114 may have to be deployed.

Further, based on the host information and the disk information, cluster deployment unit 108 may create a clustered datastore 116 on host computing system 112A. An example of clustered datastore 116 is a vSAN datastore. Furthermore, cluster deployment unit 108 may deploy virtual cluster manager node 114 on clustered datastore 116.

Furthermore, based on the encryption information associated with the key provider in the blueprint, cluster deployment unit 108 may encrypt virtual cluster manager node 114 and associated disks (e.g., disk A, disk B, and disk C). In an example, cluster deployment unit 108 may encrypt virtual cluster manager node 114 and associated disks (e.g., disk A, disk B, and disk C) using a data encryption key (DEK) generated at host computing system 112A. Based on the encryption information provided in the blueprint, cluster deployment unit 108 may encrypt the DEK using a key encryption key (KEK) provided by the key provider. In an example, the key provider may be deployed on host computing system 112A or deployed external to host computing system 112A and accessible via a network. In an example, prior to encrypting virtual cluster manager node 114 and associated disks (e.g., disk A, disk B, and disk C), cluster deployment unit 108 may validate the encryption information associated with the key provider retrieved from the blueprint.

In an example of the key provider deployed external to host computing system 112A, the encryption information may include details of the external key provider such as Internet Protocol (IP) address, username, password, server cert to determine the integrity, port to connect to, private key and certificate to connect to the KMS server has to be provided in the blueprint in order to connect to the external key provider. In this example, cluster deployment unit 108 may encrypt virtual cluster manager node 114 and associated disks (e.g., disk A, disk B, and disk c) using a data encryption key (DEK) generated at host computing system 112A. Further, based on the encryption information provided in the blueprint, cluster deployment unit 108 may establish a trust with the key provider that is deployed external to host computing system 112A. Upon establishing the trust, cluster deployment unit 108 may encrypt the DEK using a key encryption key (KEK) provided by the key provider. An example scenario where the key provider is deployed external to host computing system 112A is described in FIG. 2A.

In an example of the key provider deployed on host computing system 112A, the encryption information may include details associated with the internal key provider such as details of bootstrap script to create the internal key provider in host computing system 112A, a unique identifier to connect to the internal key provider running in host computing system 112A, or the like. An example of the internal key provider is VMware vSphere® Native Key Provider (NKP). In this example, cluster deployment unit 108 may encrypt virtual cluster manager node 114 and associated disks (e.g., disk A, disk B, and disk C) using a data encryption key (DEK) generated at host computing system 112A. Further, based on the encryption information provided in the blueprint, cluster deployment unit 108 may configure or utilize the key provider on host computing system 112A. Furthermore, based on the key provider, cluster deployment unit 108 may encrypt the DEK using a key encryption key (KEK) provided by the key provider. An example scenario where the key provider is deployed on host computing system 112A is described in FIG. 2B.

Upon encrypting virtual cluster manager node 114, cluster deployment unit 108 may create cluster 110 and add plurality of host computing systems 112A-112N that are managed by virtual cluster manager node 114 to cluster 110. Host computing systems 112A-112N may execute respective virtual machines. In this example, cluster deployment unit 108 may create a data center (e.g., a specific datacenter name) and then create cluster 110 (e.g., a specific cluster name) in the data center.

In some examples, the functionalities described in FIG. 1, in relation to instructions to implement functions of cluster deployment unit 108 and any additional instructions described herein in relation to the storage medium, may be implemented as engines or modules including any combination of hardware and programming to implement the functionalities of the modules or engines described herein. The functions of cluster deployment unit 108 may also be implemented by respective processors. In examples described herein, each processor may include, for example, one processor or multiple processors included in a single device or distributed across multiple devices.

Further, computing environment 100 illustrated in FIG. 1 is shown purely for purposes of illustration and is not intended to be in any way inclusive or limiting to the embodiments that are described herein. For example, a typical computing environment would include many more virtual computing instances, which may be distributed over multiple hosts and data centers, which might include many other types of devices, such as switches, power supplies, cooling systems, environmental controls, and the like, which are not illustrated herein. It will be apparent to one of ordinary skill in the art that the example shown in FIG. 1 as well as all other figures in this disclosure have been simplified for ease of understanding and are not intended to be exhaustive or limiting to the scope of the idea.

Figure 2A:
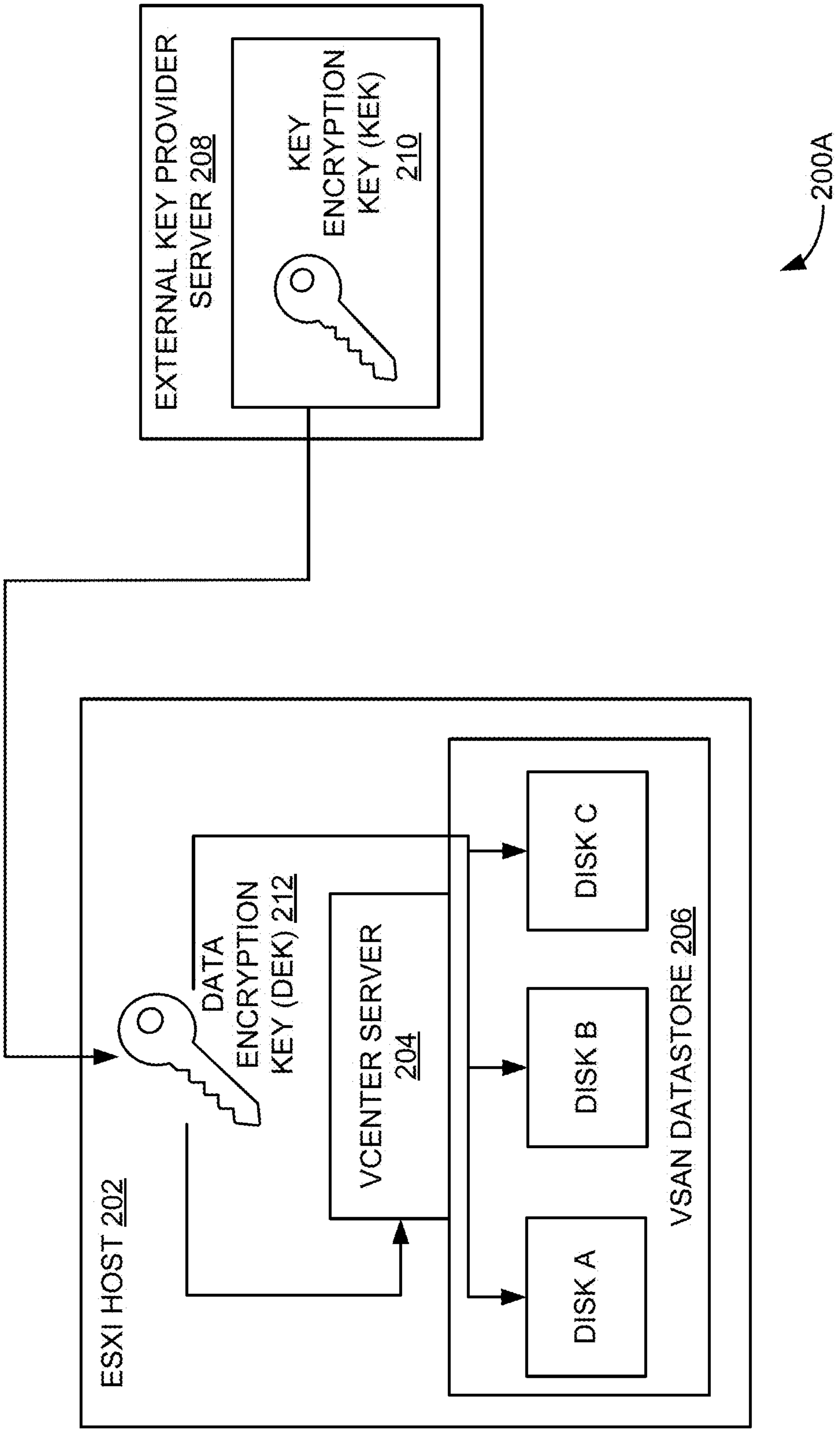
FIG. 2A is a block diagram of an example computing environment, depicting a key provider to provide encryption information to encrypt a host computing system.

FIG. 2A is a block diagram of an example computing environment 200A, depicting a key provider (e.g., an external key provider server 208) to provide encryption information to encrypt vCenter Server 204 and associated disks (i.e., disks A, B, and C). In example computing environment 200A, the key provider, i.e., external key provider server 208 may be deployed external to ESXi host 202 and accessible via a network.

In an example, a clustered datastore (e.g., vSAN datastore 206) may be created on ESXi host 202. Further, a virtual cluster manager node (e.g., vCenter server 204) may be deployed on vSAN datastore 206. vCenter Server may be an advanced server management software that provides a centralized platform for controlling vSphere environments, enabling to automate and deliver a virtual infrastructure across a hybrid cloud environment. Further, vSAN uses the concept of a disk group (e.g., disk A, disk B, and disk C) as a container for solid-state drives (SSDs) and hard disk drives (HDDs). On each node that contributes storage to a vSAN cluster, the node's local drives are organized into one or more disk groups. Each disk group includes one SSD that serves as read cache and write buffer, and one or more HDDs that serve as permanent storage. The aggregate of the disk groups from all the nodes forms a Virtual SAN datastore distributed and shared across the nodes.

In an example, vCenter server 204 and associated disks (e.g., disk A, disk B, and disk C) may be encrypted using a data encryption key (DEK) 212 generated at ESXi host 202. Further, based on the encryption information provided in a blueprint, a trust may be established with external key provider server 208 that is deployed external to ESXi host 202. Upon establishing the trust, DEK 212 may be encrypted using a key encryption key (KEK) 210 provided by external key provider server 208.

In this example, a key management system (e.g., external key provider server 208) may be externally configured by the user and the details of external key provider server 208 such as internet protocol (IP), username, password, server certificate and the like to determine the integrity, port to connect to, private key and certificate to connect to external key provider server 208 may have to be provided in a template in order to connect to external key provider server 208 from a management node (e.g., a VCSA CLI Installer of VMware).

Figure 2B:
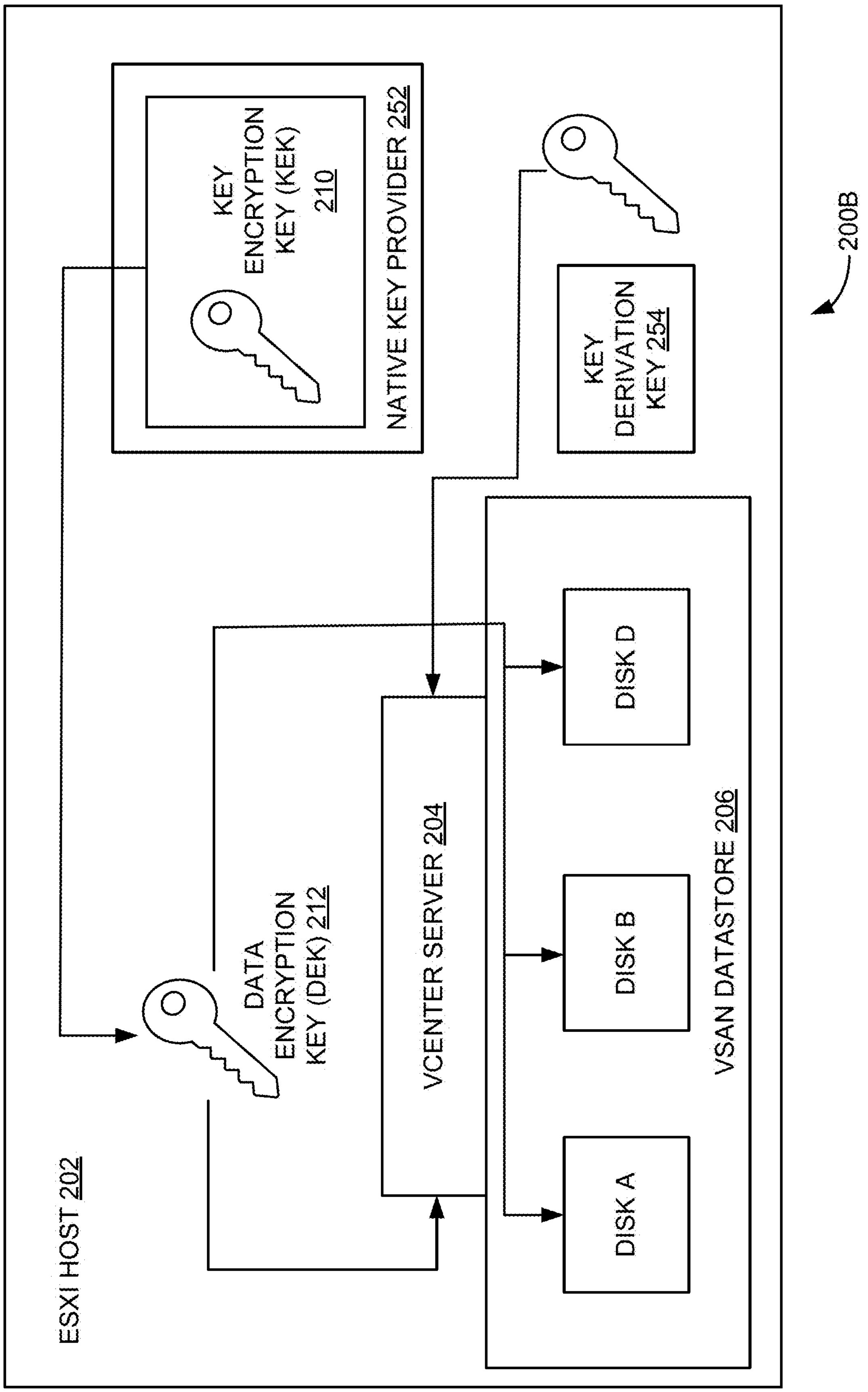
FIG. 2B is a block diagram of another example computing environment, depicting a key provider to provide the encryption information to encrypt the host computing system.

FIG. 2B is a block diagram of another example computing environment 200B, depicting a key provider (e.g., a native key provider 252) to provide the encryption information to encrypt vCenter Server 204 and associated disks (i.e., disks A, B, and C). For example, similarly named elements of FIG. 2B may be similar in structure, function, or both to elements described with respect to FIG. 2A. In example computing environment 200B, the key provider, i.e., native key provider 252 may be deployed on ESXi host 202. In an example native key provider 252 may be managed internally within a service provider (e.g., VMWare) and native key provider's 252 creation and data may be maintained in vCenter server 202. However, to support encryption enablement in greenfield, bootstrap script may have to create native key provider 252 in ESXi host 202.

In an example, vCenter server 204 and associated disks (e.g., disk A, disk B, and disk C) may be encrypted using a data encryption key (DEK) 212 generated at ESXi host 202. Further, based on the encryption information provided in a blueprint, DEK 212 may be encrypted using a key encryption key (KEK) 210 provided by native key provider 252. Further, a key derivation key 254 may generate KEK 210 from input keying material using a key derivation function.

Thus, with the examples described herein, a user may have an option to enable encryption in a greenfield deployment. Further, the user may be able to use a key management server or a vSphere native key provider to enable encryption. Also, examples described herein may enable encryption for the storage pool disks claimed in a virtual cluster manager node (e.g., vCenter server), thus supporting encryption for vSAN-2, for instance.

Figure 3:
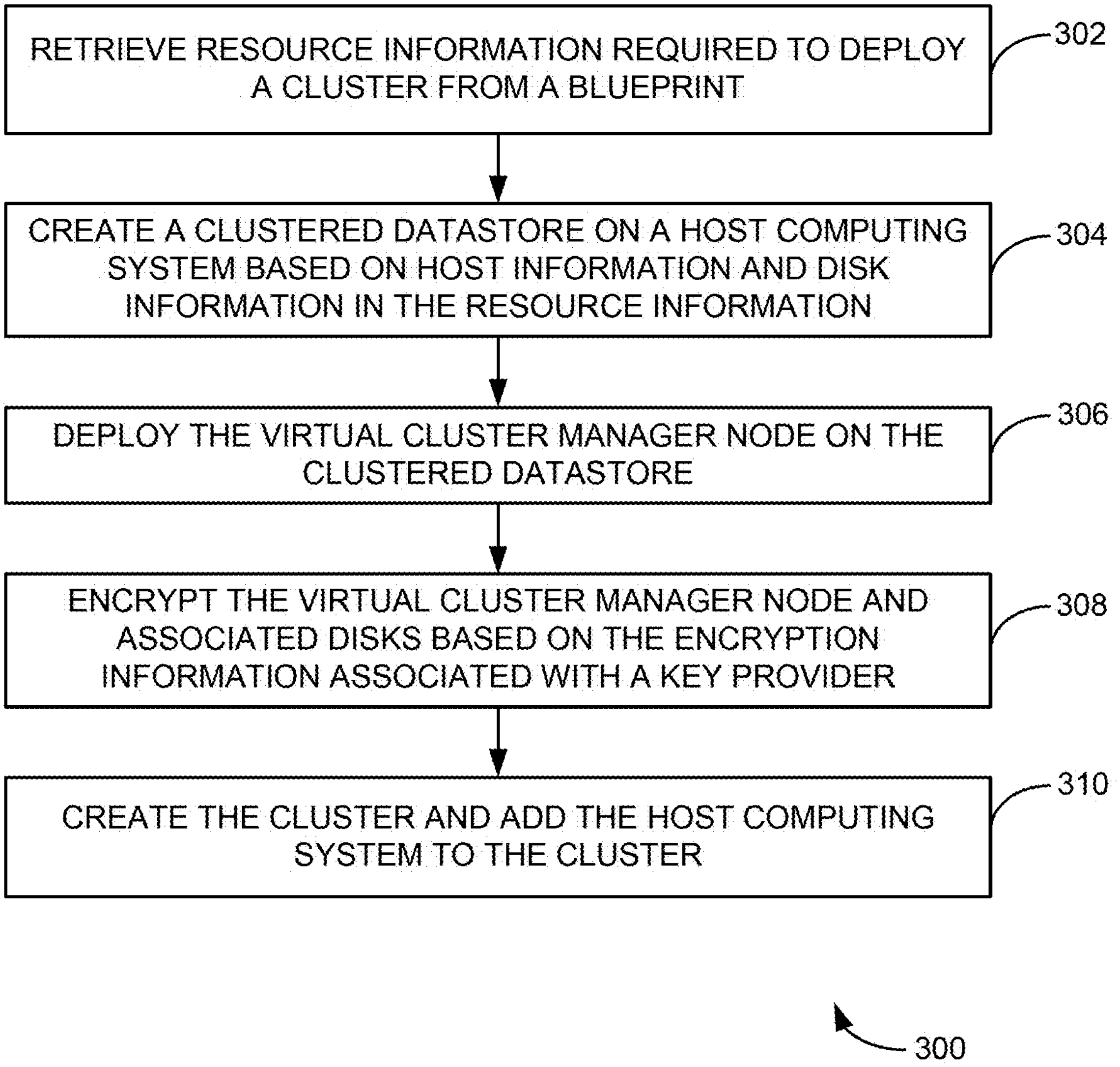
FIG. 3 is a flow diagram illustrating an example method for encrypting a virtual cluster manager node during deployment of the virtual cluster manager node.

FIG. 3 is a flow diagram illustrating an example method 300 for encrypting a virtual cluster manager node during deployment of the virtual cluster manager node. Example method 300 depicted in FIG. 3 represents generalized illustrations, and other processes may be added, or existing processes may be removed, modified, or rearranged without departing from the scope and spirit of the present application. In addition, method 300 may represent instructions stored on a computer-readable storage medium that, when executed, may cause a processor to respond, to perform actions, to change states, and/or to make decisions. Alternatively, method 300 may represent functions and/or actions performed by functionally equivalent circuits like analog circuits, digital signal processing circuits, application specific integrated circuits (ASICs), or other hardware components associated with the system. Furthermore, the flow chart is not intended to limit the implementation of the present application, but the flow chart illustrates functional information to design/fabricate circuits, generate computer-readable instructions, or use a combination of hardware and computer-readable instructions to perform the illustrated processes.

At 302, resource information required to deploy a cluster may be retrieved from a blueprint. An example cluster may include a first host computing system and a virtual cluster manager node to manage the first host computing system. For example, the virtual cluster manager node may include a virtual machine executing a management application to manage the first host computing system. In an example, the resource information may include host information and disk information required to deploy the virtual cluster manager node, and encryption information associated with a key provider.

In an example, retrieving the resource information required to deploy the cluster may include retrieving the disk information including Universally Unique Identifiers (UUIDs), canonical names, or both associated with disks to check hardware compatibility of the first host computing system to deploy the virtual cluster manager node. In another example, retrieving the resource information required to deploy the cluster may include retrieving the host information including a network identifier associated with the host computing system on which the virtual cluster manager node is to be deployed.

Based on the host information and the disk information, at 304, a clustered datastore may be created on a host computing system. At 306, the virtual cluster manager node may be deployed on the clustered datastore. Further, based on the encryption information associated with the key provider, at 308, the virtual cluster manager node and associated disks may be encrypted. In an example, encrypting the virtual cluster manager node and associated disks may include encrypting the virtual cluster manager node and associated disks using a data encryption key (DEK) generated at the host computing system. Further, based on the encryption information provided in the blueprint, the DEK may be encrypted using a key encryption key (KEK) provided by the key provider. For example, the key provider may be deployed on the host computing system or deployed external to the host computing system and accessible via a network.

In an example, encrypting the virtual cluster manager node and associated disks may include encrypting the virtual cluster manager node and associated disks using a data encryption key (DEK) generated at the host computing system. Further, based on the encryption information provided in the blueprint, a trust may be established with the key provider that is deployed external to the host computing system. Upon establishing the trust, the DEK may be encrypted using a key encryption key (KEK) provided by the key provider.

In another example, encrypting the virtual cluster manager node and associated disks may include encrypting the virtual cluster manager node and associated disks using a data encryption key (DEK) generated at the host computing system. Further, based on the encryption information provided in the blueprint, the key provider on the host computing system may be configured or utilized. Furthermore, based on the key provider, the DEK may be encrypted using a key encryption key (KEK) provided by the key provider.

In an example, prior to encrypting the virtual cluster manager node and associated disks, the encryption information associated with the key provider retrieved from the blueprint may be validated. Upon encrypting the virtual cluster manager node, at 310, the cluster may be created and then the first host computing system that is managed by the virtual cluster manager node may be added to the cluster. In an example, creating the cluster may include creating a data center and then creating the cluster in the data center.

In other examples, retrieving the resource information may include retrieving, from the blueprint, resource information required to deploy a second host computing system (s). Further, the second host computing system may be added to the cluster based on the resource information associated with the second host computing system(s). Further, method 300 may include enabling a user to modify parameters of the blueprint used to deploy the cluster to include the encryption information associated with the key provider.

Figure 4:
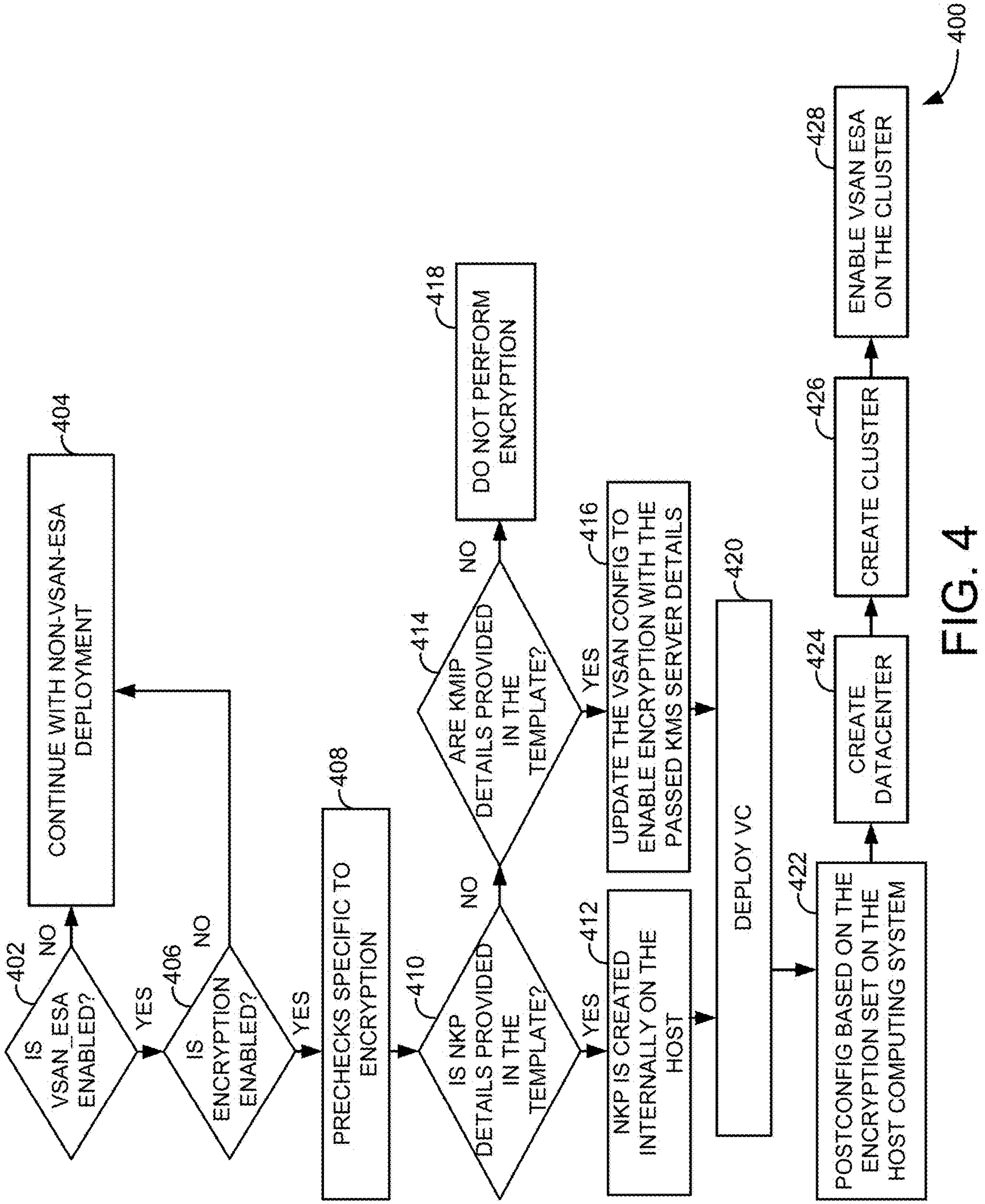
FIG. 4 is a flow diagram illustrating an example method for deploying a cluster in a computing environment.

FIG. 4 is a flow diagram illustrating an example method 400 for deploying a cluster in a computing environment. Upon receiving a request to deploy the cluster, at 402, a check may be made to determine whether vSAN Express Storage Architecture (e.g., 'vSAN ESA') is enabled. The vSAN ESA is a new hyperconverged infrastructure (HCl) storage architecture designed to deliver space-efficient and highly resilient storage without compromising performance. The request to deploy the cluster may be defined by a blueprint. When 'vsan-esa' not enabled, a deployment process with 'non-vsan-esa' may be considered, at 404. When 'vsan-esa' is enabled, at 406, a check may be made to determine whether an encryption process is enabled. When the encryption is disabled, the deployment process with 'non-vsan-esa' may be considered, at 404.

When the encryption is enabled, at 408, prechecks specific to the encryption may be performed. An example precheck may include validating the encryption parameters provided in the template. The Native Key Provider (NKP) and key management system (KMS) Key Management Interoperability Protocol (KMIP) are mutually exclusive. The precheck validates that only one of the NKP and KMS is populated in the template, check the connectivity to the server provided in the template, IP format of the KMS if provided, and the like.

At 410, a check may be made to determine whether a native key provider's (NKP) details are provided in a template. When the NKP details are provided in the template, the NKP may be created internally on a host computing system, at 412. When the NKP details are not provided in the template, at 414, a check may be made to determine whether a key management internet protocol (KMIP) details are provided in the template. When the KMIP details are provided in the template, the vSAN configuration may be updated to enable encryption with the passed key management system (KMS) server details, at 416. When the NKP details and KMIP details are not provided in the template, the encryption may not be performed, at 418.

Further at 420, a virtual cluster manager node, i.e., vCenter (VC) may be deployed. At 422, post configuration based on the encryption set on the host computing system may be performed. In this example, the vCenter server and associated disks may be encrypted using the encryption information provided in the template. Upon encrypting the vCenter server and associated disks, at 424, a data center may be created. At 426, the cluster may be created in the data center and the host computing system may be added to the cluster. At 428, 'vsan-esa' may be enabled on the created cluster. Thus, deployment or installation of the clusters may be achieved.

Thus, examples described herein may provide a management node (e.g., vCSA CLI Installer) supporting encryption. vCenter Server CLI installer may take the disk UUIDs or canonical names to check the hardware compatibility and the ESXi host IP as an input. Further, two additional parameters may have to be provided in the CLI installer for a native key provider and a key management system. Furthermore, the encryption parameters provided in the template may be validated. For example:

- The native key provider and the key management interoperability protocol may be mutually exclusive. The precheck validates that only one of these may be populated in the template.
- The precheck to check the connectivity to the server may be provided in the template.
- IP format validation of the KMS if provided.

Further, for an upcoming VCSA deployment, a single node vSAN datastore may be create on a standalone host. This step may accept various provider IDs, key IDs, key derivation key (KDK), and key management system server certificate depending on whether it is key management system or native key provider. Furthermore, post-deployment configuration may include configuring encryption on the vCenter server using the encryption details derived from the host with encryption enabled during 'PreparevVsan' phase and then creating a vSAN cluster. Further, an encrypted vSAN Datastore and a vSAN bootstrapped cluster may be created.

FIG. 5 shows an example template or blueprint 500 to deploy a vCenter Server with a vSAN and vSphere Life Management (vLCM) cluster on a host computing system (e.g., an ESXi host). As shown in FIG. 5, template 500 may include a first portion 502 specifying a command to deploy vCenter Server with a vSAN and vLCM cluster on the ESXi host. Further, template 500 may include an optional portion to create the vSAN bootstrap cluster. Furthermore, template 500 may include a second portion 504 describing the configuration for vSAN encryption service. It may contain encryption enablement state, Key Encryption Key (KEK)

identifier (ID), Key Management System (KMS) information, client certificate, private key, and KMS certificates. It may be supported when vSAN_MAX is enabled. Further, 'kmipServer' and 'nativeKeyProvider' may be mutually exclusive."

Further, template 500 may include a third portion 506 to specify that the KMS server where the global KEK is created and stored. For example, the host computing system may fetch the KEK from the KMS cluster with given KEK ID. Furthermore, a fourth portion 508 may include the configuration for creating a native key provider. In addition, template 500 may include a portion to provide the 'deployment_option' key with a value, which may affect the vCenter Server Appliance's configuration parameters, such as the vCenter Server Appliance's number of vCPUs, the memory size, the storage size, and the maximum numbers of ESXi hosts and VMs which can be managed.

Figure 6:
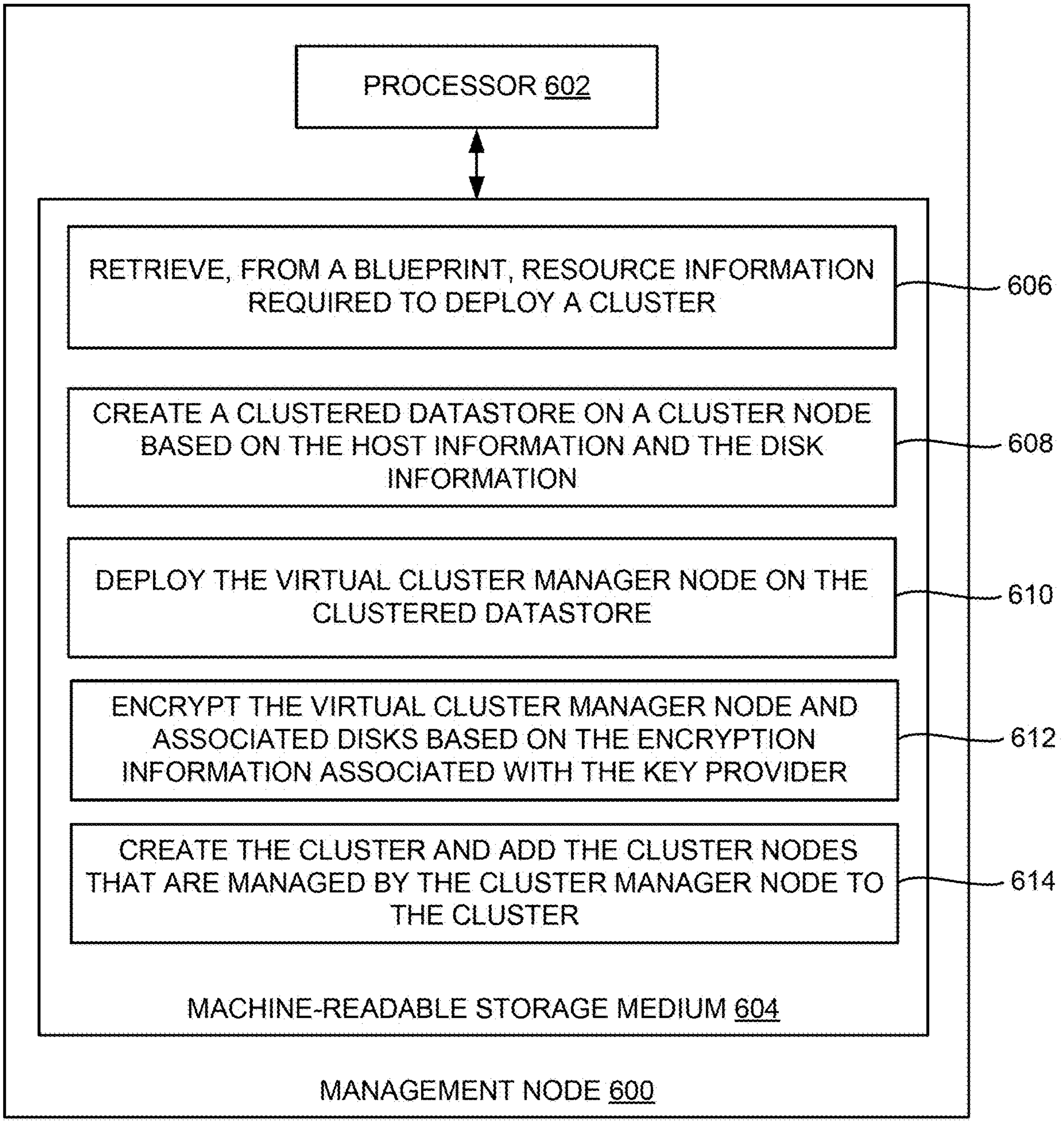
FIG. 6 is a block diagram of an example management node including non-transitory computer-readable storage medium storing instructions to deploy a cluster.

FIG. 6 is a block diagram of an example management node 600 including non-transitory computer-readable storage medium 604 storing instructions to deploy a cluster. Management node 600 may include a processor 602 and computer-readable storage medium 604 communicatively coupled through a system bus. Processor 602 may be any type of central processing unit (CPU), microprocessor, or processing logic that interprets and executes computer-readable instructions stored in computer-readable storage medium 604. Computer-readable storage medium 604 may be a random-access memory (RAM) or another type of dynamic storage device that may store information and computer-readable instructions that may be executed by processor 602. For example, computer-readable storage medium 604 may be synchronous DRAM (SDRAM), double data rate (DDR), Rambus® DRAM (RDRAM), Rambus® RAM, etc., or storage memory media such as a floppy disk, a hard disk, a CD-ROM, a DVD, a pen drive, and the like. In an example, computer-readable storage medium 604 may be a non-transitory computer-readable medium. In an example, computer-readable storage medium 604 may be remote but accessible to management node 600.

Computer-readable storage medium 604 may store instructions 606, 608, 610, 612, and 614. Instructions 606 may be executed by processor 602 to retrieve, from a blueprint, resource information required to deploy a cluster. The virtual machine cluster may include a plurality of cluster nodes and a virtual cluster manager node to manage the plurality of cluster nodes. In an example, the resource information may include host information and disk information required to deploy the virtual cluster manager node, and encryption information associated with a key provider.

Based on the host information and the disk information, instructions 608 may be executed by processor 602 to create a clustered datastore on a cluster node of the plurality of cluster nodes. Instructions 610 may be executed by processor 602 to deploy the virtual cluster manager node on the clustered datastore.

Further, based on the encryption information associated with the key provider, instructions 612 may be executed by processor 602 to encrypt the virtual cluster manager node and associated disks. In an example, instructions 612 to encrypt the virtual cluster manager node and associated disks may include instructions to encrypt the virtual cluster manager node and associated disks using a data encryption key (DEK) generated at the cluster node. Further, based on the encryption information provided in the blueprint, the DEK may be encrypted using a key encryption key (KEK) provided by the key provider.

In an example, instructions 612 to encrypt the virtual cluster manager node and associated disks may include instructions to encrypt the virtual cluster manager node and associated disks using a data encryption key (DEK) generated at the cluster node. Further, based on the encryption information provided in the blueprint, a trust may be established with the key provider that is deployed external to the cluster node. Upon establishing the trust, the DEK may be encrypted using a key encryption key (KEK) provided by the key provider.

In another example, instructions 612 to encrypt the virtual cluster manager node and associated disks may include instructions to encrypt the virtual cluster manager node and associated disks using a data encryption key (DEK) generated at the cluster node. Further, based on the encryption information provided in the blueprint, the key provider on the cluster node may be configured or utilized. Furthermore, based on the key provider, the DEK may be encrypted using a key encryption key (KEK) provided by the key provider.

Upon encrypting the virtual cluster manager node, instructions 614 may be executed by processor 602 to create the cluster and add the plurality of cluster nodes that are managed by the virtual cluster manager node to the cluster.

The above-described examples are for the purpose of illustration. Although the above examples have been described in conjunction with example implementations thereof, numerous modifications may be possible without materially departing from the teachings of the subject matter described herein. Other substitutions, modifications, and changes may be made without departing from the spirit of the subject matter. Also, the features disclosed in this specification (including any accompanying claims, abstract, and drawings), and any method or process so disclosed, may be combined in any combination, except combinations where some of such features are mutually exclusive.

The terms "include," "have," and variations thereof, as used herein, have the same meaning as the term "comprise" or appropriate variation thereof. Furthermore, the term "based on", as used herein, means "based at least in part on." Thus, a feature that is described as based on some stimulus can be based on the stimulus or a combination of stimuli including the stimulus. In addition, the terms "first" and "second" are used to identify individual elements and may not be meant to designate an order or number of those elements.

The present description has been shown and described with reference to the foregoing examples. It is understood, however, that other forms, details, and examples can be made without departing from the spirit and scope of the present subject matter that is defined in the following claims.

What is claimed is:

1. A method comprising:

retrieving, from a blueprint, resource information required to deploy a cluster comprising a first host computing system and a virtual cluster manager node to manage the first host computing system, wherein the resource information comprises host information and disk information required to deploy the virtual cluster manager node, and encryption information associated with a key provider;

based on the host information and the disk information, creating a clustered datastore on the first host computing system;

deploying the virtual cluster manager node on the clustered datastore;

based on the encryption information associated with the key provider, encrypting the virtual cluster manager node and associated disks; and upon encrypting the virtual cluster manager node, creating the cluster and adding the host computing system to the cluster;

wherein encrypting the virtual cluster manager node and associated disks comprises:

encrypting the virtual cluster manager node and associated disks using a data encryption key (DEK) generated at the host computing system;

based on the encryption information provided in the blueprint, establishing a trust with the key provider that is deployed external to the host computing system; and upon establishing the trust, encrypting the DEK using a key encryption key (KEK) provided by the key provider.

2. The method of claim 1, wherein creating the cluster comprises:

creating a data center; and creating the cluster in the data center.

3. The method of claim 1, wherein the key provider is deployed on the host computing system or deployed external to the host computing system and accessible via a network.

4. The method of claim 1, wherein encrypting the virtual cluster manager node and associated disks comprises:

encrypting the virtual cluster manager node and associated disks using a data encryption key (DEK) generated at the host computing system; and based on the encryption information provided in the blueprint, encrypting the DEK using a key encryption key (KEK) provided by the key provider.

5. The method of claim 1, wherein encrypting the virtual cluster manager node and associated disks comprises:

encrypting the virtual cluster manager node and associated disks using a data encryption key (DEK) generated at the host computing system;

based on the encryption information provided in the blueprint, configuring or utilizing the key provider on the host computing system; and based on the key provider, encrypting the DEK using a key encryption key (KEK) provided by the key provider.

6. The method of claim 1, wherein retrieving, from the blueprint, the resource information required to deploy the cluster comprises:

retrieving the disk information including Universally Unique Identifiers (UUIDs), canonical names, or both associated with disks to check hardware compatibility of the first host computing system to deploy the virtual cluster manager node.

7. The method of claim 1, wherein retrieving, from the blueprint, the resource information required to deploy the cluster comprises:

retrieving the host information including a network identifier associated with the host computing system on which the virtual cluster manager node is to be deployed.

8. The method of claim 1, wherein the virtual cluster manager node comprises a virtual machine executing a management application to manage the first host computing system.

9. The method of claim 1, further comprising:

enabling a user to modify parameters of the blueprint used to deploy the cluster to include the encryption information associated with the key provider.

10. The method of claim 1, further comprising:

prior to encrypting the virtual cluster manager node and associated disks, validating the encryption information associated with the key provider retrieved from the blueprint.

11. The method of claim 1, wherein retrieving the resource information comprises:

retrieving, from the blueprint, resource information required to deploy a second host computing system.

12. The method of claim 11, further comprising:

adding the second host computing system to the cluster based on the resource information associated with the second host computing system.

13. A management node comprising:

a processor; and memory coupled to the processor, wherein the memory comprises a cluster deployment unit to:

retrieve, from a blueprint, resource information required to deploy a cluster comprising a host computing system and a virtual cluster manager node to manage the host computing system, wherein the resource information comprises host information and disk information required to deploy the virtual cluster manager node, and encryption information associated with a key provider;

based on the host information and the disk information, create a clustered datastore on the host computing system;

deploy the virtual cluster manager node on the clustered datastore;

based on the encryption information associated with the key provider, encrypt the virtual cluster manager node and associated disks; and upon encrypting the virtual cluster manager node, create a cluster and add the host computing system to the cluster;

wherein cluster deployment unit is to:

encrypt the virtual cluster manager node and associated disks using a data encryption key (DEK) generated at the host computing system;

based on the encryption information provided in the blueprint, establish a trust with the key provider that is deployed external to the host computing system; and upon establishing the trust, encrypt the DEK using a key encryption key KEK) provided by the key provider.

14. The management node of claim 13, wherein cluster deployment unit is to:

create a data center; and create the cluster in the data center.

15. The management node of claim 13, wherein cluster deployment unit is to:

encrypt the virtual cluster manager node and associated disks using a data encryption key (DEK) generated at the host computing system; and based on the encryption information provided in the blueprint, encrypt the DEK using a key encryption key (KEK) provided by the key provider.

16. The management node of claim 13, wherein cluster deployment unit is to:

encrypt the virtual cluster manager node and associated disks using a data encryption key (DEK) generated at the host computing system;

based on the encryption information provided in the blueprint, configure or utilizing the key provider on the host computing system; and based on the key provider, encrypt the DEK using a key encryption key (KEK) provided by the key provider.

17. A non-transitory computer readable storage medium comprising instructions executable by a processor of a management node to:

retrieve, from a blueprint, resource information required to deploy a cluster comprising a plurality of cluster nodes and a virtual cluster manager node to manage the plurality of cluster nodes, wherein the resource information comprises host information and disk information required to deploy the virtual cluster manager node, and encryption information associated with a key provider;

based on the host information and the disk information, create a clustered datastore on a cluster node of the plurality of cluster nodes;

deploy the virtual cluster manager node on the clustered datastore;

based on the encryption information associated with the key provider, encrypt the virtual cluster manager node and associated disks; and upon encrypting the virtual cluster manager node, create a cluster and add the plurality of cluster nodes that are managed by the virtual cluster manager node to the cluster;

wherein encrypting the virtual cluster manager node and associated disks comprises:

encrypting the virtual cluster manager node and associated disks using a data encryption key (DEK) generated at the host computing system;

based on the encryption information provided in the blueprint, establishing a trust with the key provider that is deployed external to the host computing system; and upon establishing the trust, encrypting the DEK using a key encryption key (KEK) provided by the key provider.

* * * * *